(12) United States Patent
Kosaka et al.

(10) Patent No.: US 10,289,149 B2
(45) Date of Patent: May 14, 2019

(54) INPUT OPERATING APPARATUS

(71) Applicant: ALPS ALPINE CO., LTD., Tokyo (JP)

(72) Inventors: Ken Kosaka, Miyagi-ken (JP); Hiroshi Hanzawa, Miyagi-ken (JP); Tomonori Miura, Miyagi-ken (JP)

(73) Assignee: ALPS ALPINE CO., LTD., Tokyo (JP)

( * ) Notice: Subject to any disclaimer, the term of this patent is extended or adjusted under 35 U.S.C. 154(b) by 40 days.

(21) Appl. No.: 15/476,308

(22) Filed: Mar. 31, 2017

(65) Prior Publication Data

US 2017/0293317 A1 Oct. 12, 2017

(30) Foreign Application Priority Data

Apr. 6, 2016 (JP) ................................. 2016-076737

(51) Int. Cl.
*G05G 5/05* (2006.01)
*B60Q 1/00* (2006.01)
*G05G 1/04* (2006.01)

(52) U.S. Cl.
CPC ............. *G05G 5/05* (2013.01); *B60Q 1/0082* (2013.01); *G05G 1/04* (2013.01)

(58) Field of Classification Search
CPC .......... G05G 5/05; G05G 1/04; B60Q 1/0082; H01H 25/04

USPC ........................................... 200/61.27, 61.28
See application file for complete search history.

(56) References Cited

U.S. PATENT DOCUMENTS

| 6,660,951 B2 * | 12/2003 | Uchiyama | B60Q 1/425 200/61 |
| 8,552,319 B2 * | 10/2013 | Nakamura | B60Q 1/425 200/61.27 |
| 8,822,856 B2 * | 9/2014 | Kosaka | H01H 21/06 200/61.3 |

FOREIGN PATENT DOCUMENTS

JP      2012-195103      10/2012

* cited by examiner

*Primary Examiner* — Edwin A. Leon
*Assistant Examiner* — Lheiren Mae A Caroc
(74) *Attorney, Agent, or Firm* — Brinks Gilson & Lione

(57) ABSTRACT

A first virtual rotational axis exists at a position separated from the position of a first virtual line which passes through a path through which the cancel lever is advanced and retracted (in the longitudinal direction of an elongated guide hole). A first engaging portion of the cancel lever is line symmetric about a second virtual line which connects the first virtual rotational axis of a cancel cam member and a second virtual rotational axis of the cancel lever.

7 Claims, 17 Drawing Sheets

INPUT OPERATING APPARATUS

CLAIM OF PRIORITY

This application claims benefit of priority to Japanese Patent Application No. 2016-076737 filed on Apr. 6, 2016, which is hereby incorporated by reference in its entirety.

BACKGROUND

1. Field of the Disclosure

The present disclosure relates to input operating apparatuses that include an operating lever which is at least rotatable from a neutral position. In particular, the present disclosure relates to an input operating apparatus that has the function of, for example, automatically returning the operating lever from a left-turn indication rotational position or a right-turn indication rotational position to a neutral position when a steering wheel having been rotated in one direction is rotated in the opposite direction to the one direction.

2. Description of the Related Art

An input operating apparatus as one of input operating apparatuses may be provided in a driver's seat of an automobile. In the input operating apparatus, an operating lever is rotatably provided in a housing attached to a steering column. A switch driven by rotation of the operating lever is provided in the housing so as to allow a left-turn indicator lamp or a right-turn indicator lamp to flash by rotating the operating lever from a neutral position to a left-turn indication rotational position or a right-turn indication rotational position.

Although the operating lever is latched at the left-turn indication rotational position or the right-turn indication rotational position, the input operating apparatus includes a cancel mechanism that automatically returns the operating lever from the left-turn indication rotational position or the right-turn indication rotational position to the neutral position when the steering wheel having been rotated in an indicated direction is rotated in the opposite direction. Examples of such an input operating apparatus include an input operating apparatus described in, for example, Japanese Unexamined Patent Application Publication No. 2012-195103.

With the above-described related-art input operating apparatus, the operating lever is returned to an initial position by driving a cancel lever with a cancel cam rotated together with the steering wheel. In this input operating apparatus, the rotational center of the cancel cam is positioned on a line extending in a direction in which the cancel lever is advanced toward and retracted from a rotational path of the cancel cam.

Accordingly, it is required that the distance between the operating lever and the cancel cam, that is, the distance between the operating lever and the steering wheel be large. Thus, it is difficult to locate the operating lever close to the steering wheel.

SUMMARY

An input operating apparatus includes an operating lever, a holding body that holds a base of the operating lever such that the base is rotatable in one plane, a support body that supports the holding body such that the holding body is rotatable in another plane which intersects the one plane, and a cancel lever that is movable as the holding body is rotated, that is rotatable, and that is able to be advanced toward and retracted from a rotational path of a cancel projection which is rotated about a first virtual rotational axis together with a steering shaft. The first virtual rotational axis exists at a position separated from a position of a first virtual line which passes through a path through which the cancel lever is advanced and retracted.

Thus, even when the distance between a cancel cam member that includes the cancel projection and the cancel lever is reduced, the distance required for advancing and retracting the cancel lever can be sufficiently ensured, and size reduction can be achieved. This allows the distance between the cancel cam member and the operating lever to be reduced.

DESCRIPTION OF THE EXEMPLARY EMBODIMENTS

Embodiments of the present invention will be described.

Figure 1:
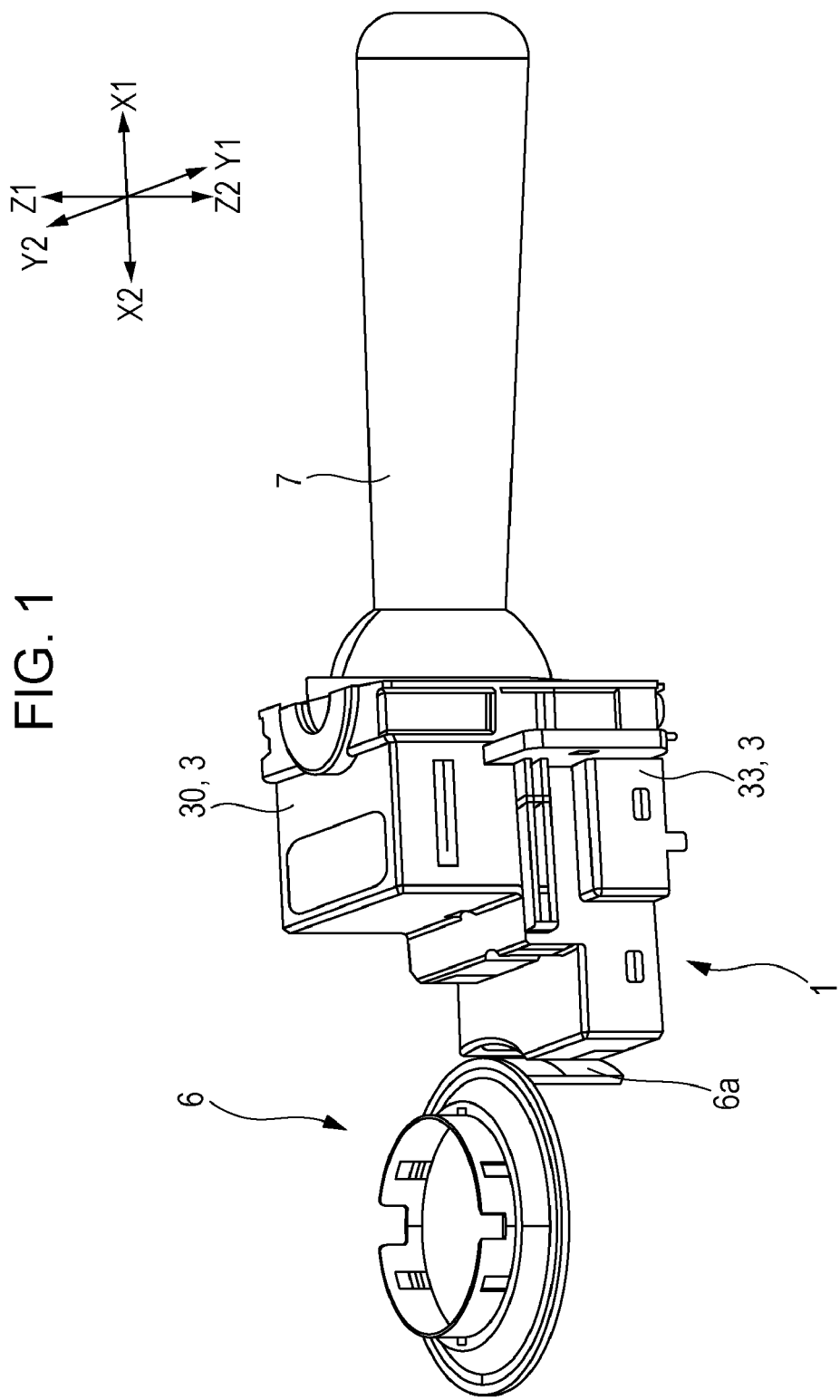
FIG. 1 is an external perspective view of a cancel cam member and an input operating apparatus according to an embodiment of the present invention.
Figure 2:
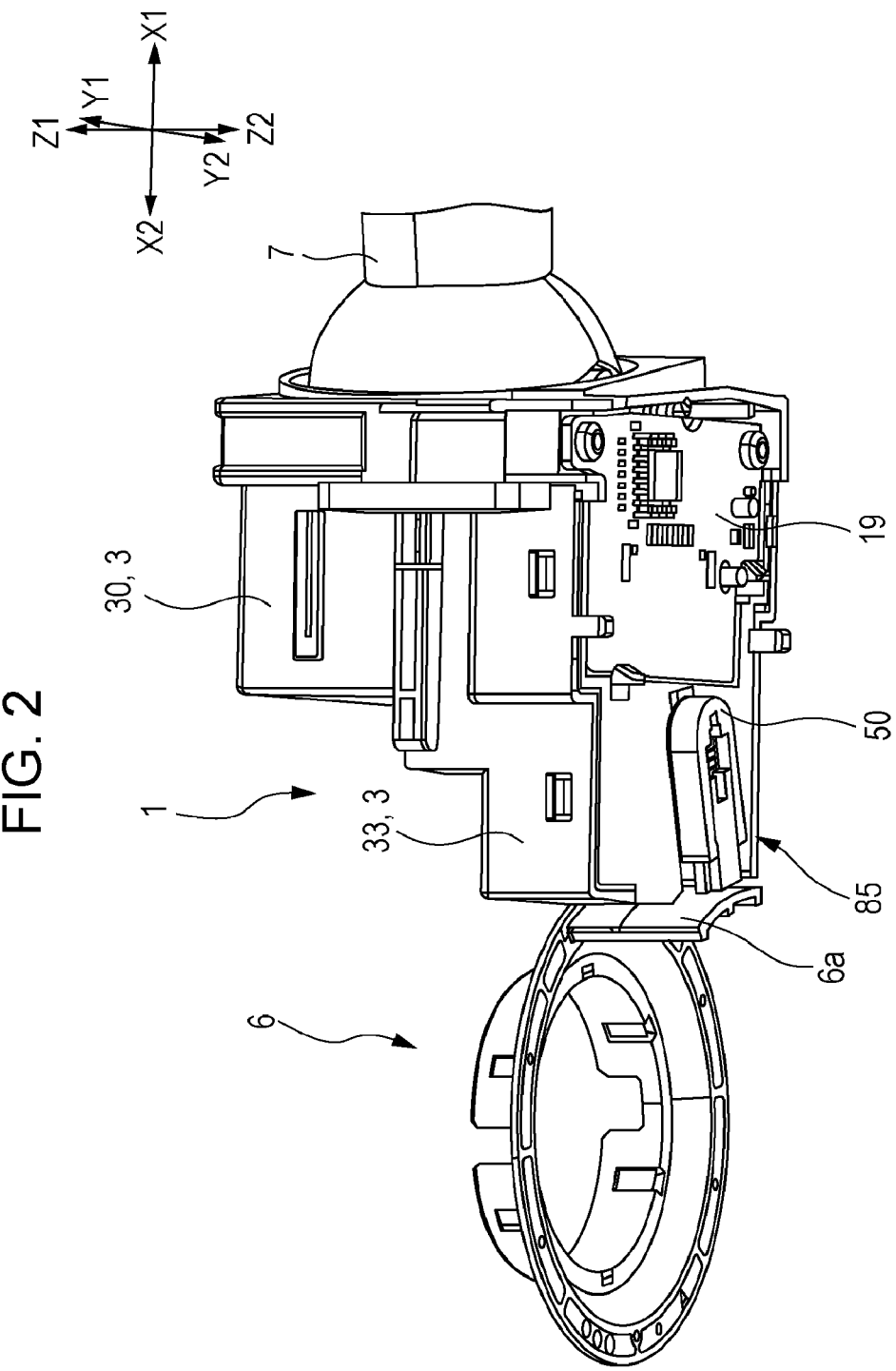
FIG. 2 is an external perspective view of the input operating apparatus illustrated in FIG. 1 seen from the Z2 direction toward the Z1 direction.
Figure 3:
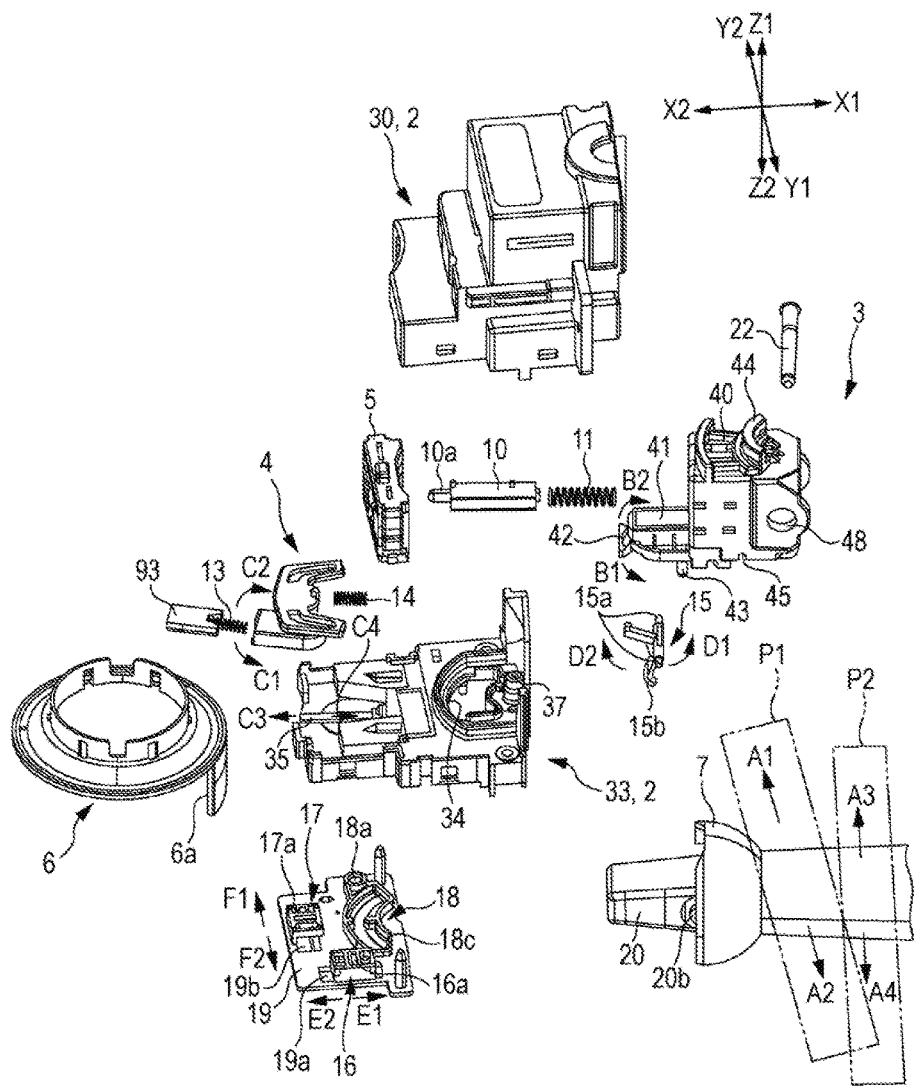
FIG. 3 is an exploded perspective view of the input operating apparatus illustrated in FIGS. 1 and 2.

The embodiments of the present invention are described in detail with reference to the drawings. FIG. 1 is an external perspective view of a cancel cam member 6 and an input operating apparatus 1 according to the embodiment of the present invention. FIG. 2 is an external perspective view of the input operating apparatus 1 illustrated in FIG. 1 seen from the Z2 direction toward the Z1 direction. FIG. 3 is an exploded perspective view of the input operating apparatus 1 illustrated in FIGS. 1 and 2.

Figure 4:
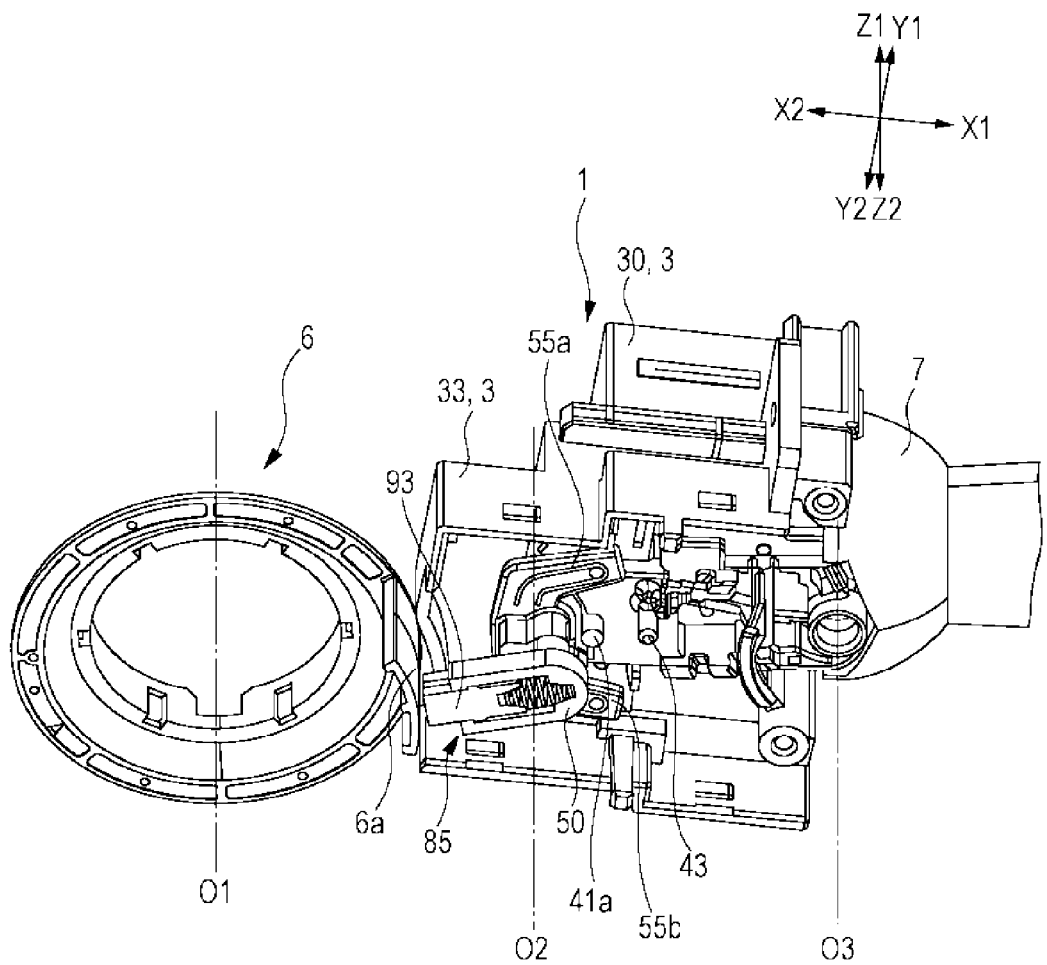
FIG. 4 is an external perspective view of the input operating apparatus illustrated in FIG. 2 with components such as a base plate omitted.
Figure 5:
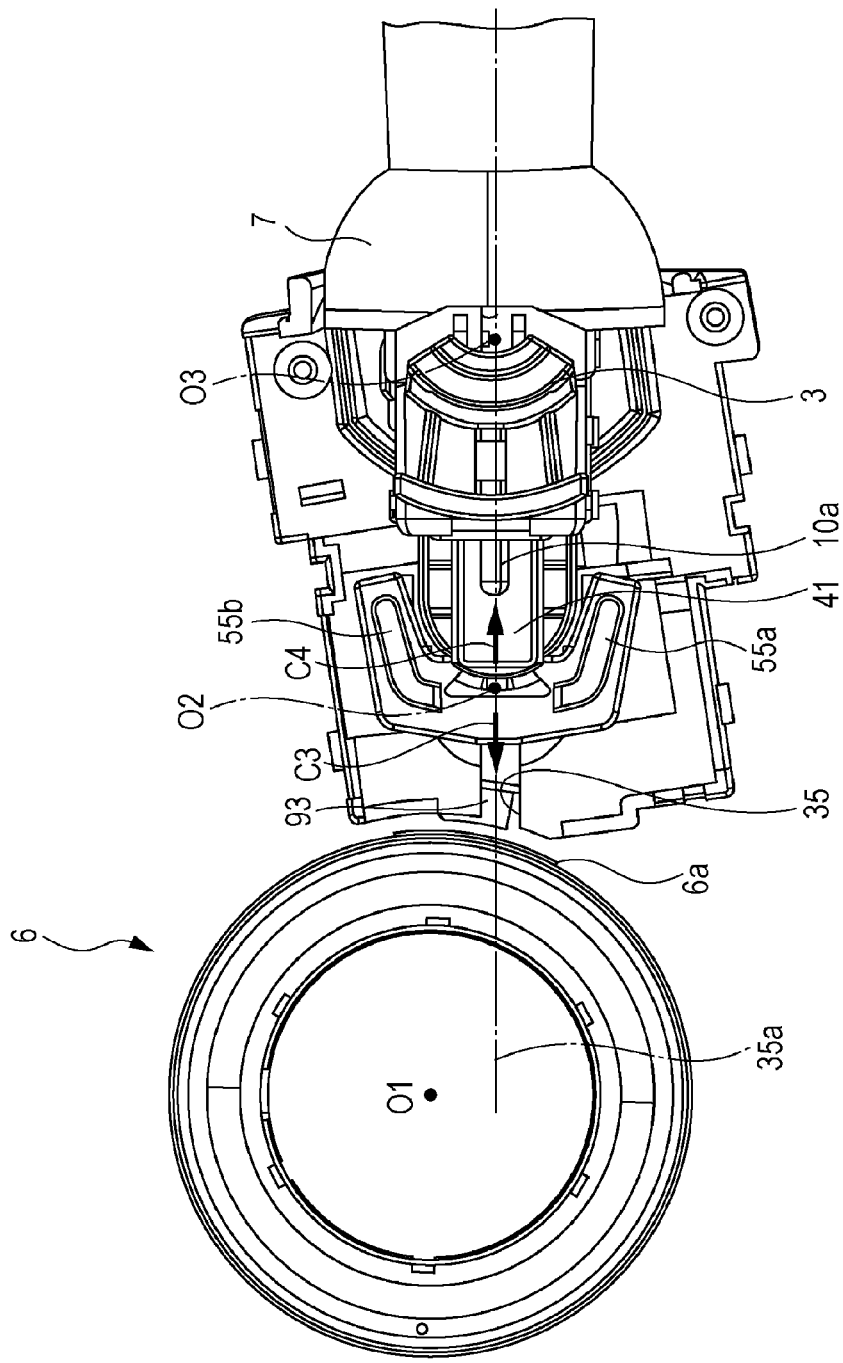
FIG. 5 is an external perspective view of the input operating apparatus seen from the Z1 direction toward the Z2 direction illustrated in FIG. 1 with an upper casing omitted.
Figure 6:
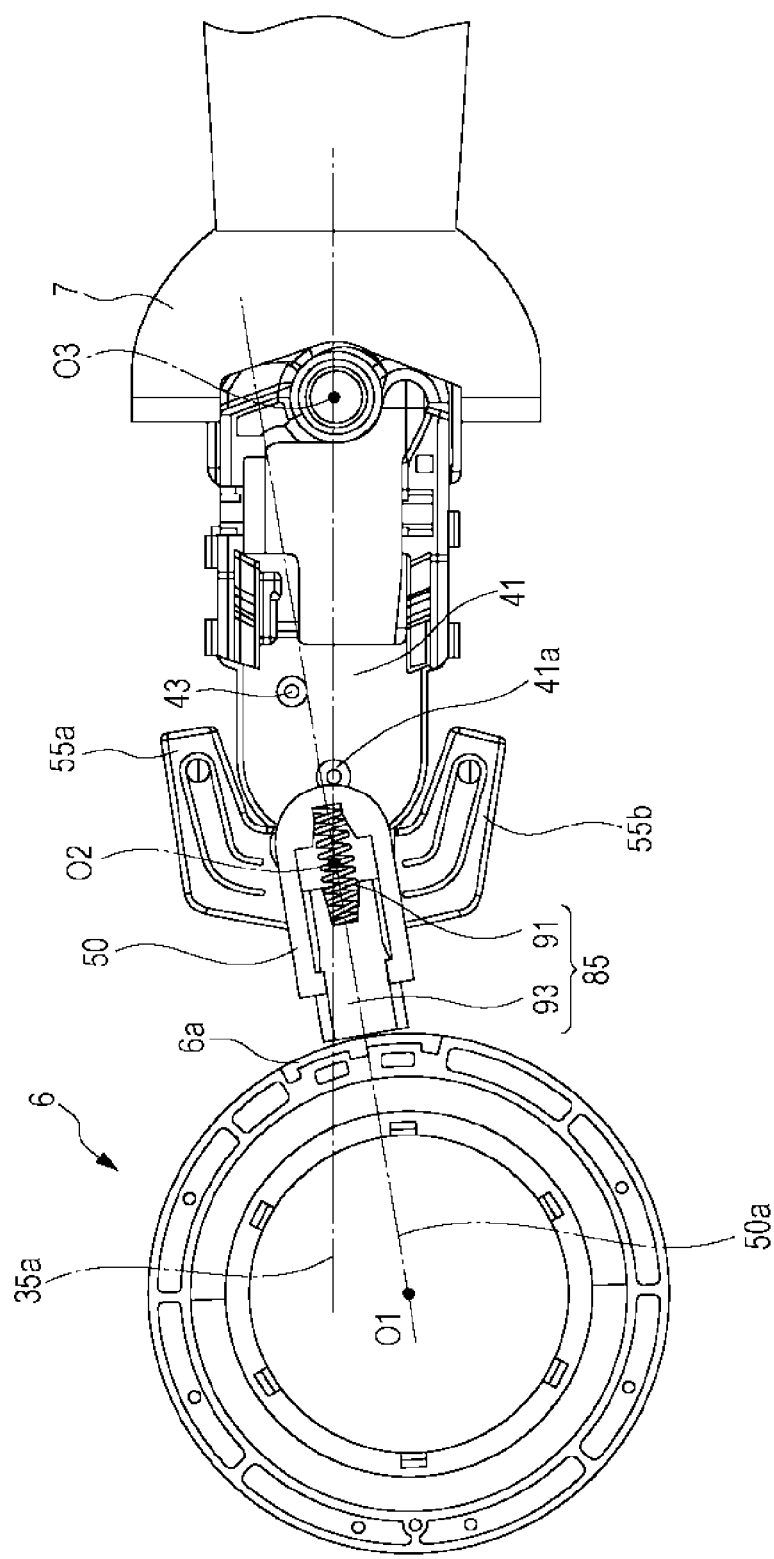
FIG. 6 is an external perspective view of the input operating apparatus seen from the Z2 direction toward the Z1 direction illustrated in FIG. 1 with the upper casing, a lower casing, and the base plate omitted.
Figure 7:
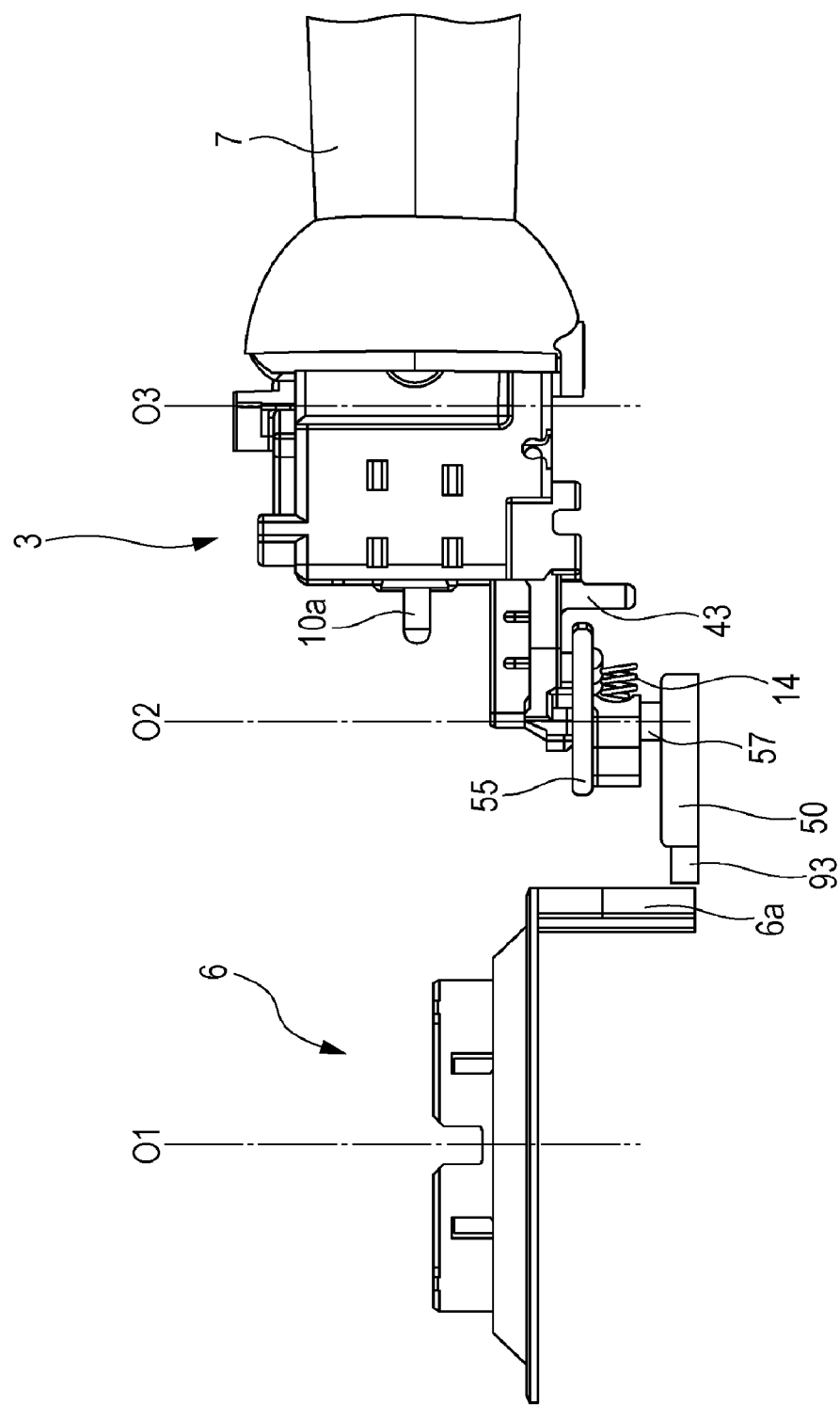
FIG. 7 is an external side view of the input operating apparatus illustrated in FIG. 1 seen from the Y1 direction toward the Y2 direction illustrated in FIG. 1 with the upper casing and the lower casing omitted.

FIG. 4 is an external perspective view of the input operating apparatus 1 illustrated in FIG. 2 with components such as a base plate 19 omitted. FIG. 5 is an external perspective view of the input operating apparatus 1 seen from the Z1 direction toward the Z2 direction illustrated in FIG. 1 with an upper casing 30 omitted. FIG. 6 is an external perspective view of the input operating apparatus 1 seen from the Z2 direction toward the Z1 direction illustrated in FIG. 1 with the upper casing 30, a lower casing 33, and the base plate 19 omitted. FIG. 7 is an external side view of the input operating apparatus 1 illustrated in FIG. 1 seen from the Y1 direction toward the Y2 direction illustrated in FIG. 1 with the upper casing 30 and the lower casing 33 omitted.

As illustrated in FIG. 3, the input operating apparatus 1 includes an operating lever 7, a housing 2, a holding body 3, a cancel lever 4, and so forth.

The housing 2 includes the upper casing 30 and the lower casing (support body) 33. The housing 2 is mounted in a steering column of an automobile and supports the holding body 3 such that the holding body 3 is rotatable in another plane that intersects one plane.

The holding body 3 supports a base 20 of the operating lever 7 such that the base 20 is rotatable on the one plane.

The cancel lever 4 is provided in the housing 2 and movable as the holding body 3 is rotated. The cancel lever 4 is rotatable and, preferably, can be advanced toward and retracted from a rotational path of a cancel projection 6a that is rotated about a first virtual rotational axis O1 together with a steering shaft.

The operating lever 7 outwardly projects from the housing 2 and exposed to the interior of the automobile.

Preferably, as illustrated in FIGS. 3 and 5, the cancel lever 4 is guided by an elongated guide hole 35 (guide portion) formed in the lower casing 33 so as to be advanced toward and retracted from (C3 and C4 directions illustrated in FIGS. 3 and 5) the rotational path of the cancel projection 6a of the cancel cam member 6. At this time, the cancel lever 4 is rotatably (C1 and C2 directions illustrated in FIG. 3) guided.

Furthermore, the first virtual rotational axis O1 exists at a position separated from the position of a first virtual line 35a which passes through a path through which the cancel lever 4 is advanced and retracted.

Thus, even when the distance between the cancel cam member 6 and the cancel lever 4 is reduced, the distance required for advancing and retracting the cancel lever 4 can be sufficiently ensured, and size reduction can be achieved. This allows the distance between the cancel cam member 6 and the operating lever 7 to be reduced.

The operating lever 7 can be operated to rotate in four directions, that is, the A1 to A4 directions illustrated in FIG. 3. The A1 and A2 directions are in the one plane, that is, in a single plane parallel to a plane P1. The A3 and A4 directions are in the other plane intersecting the plane P1, that is, in a single plane parallel to a plane P2. When the operating lever 7 is rotated in the A1 or A2 direction, the operating lever 7 is latched at a left-turn indication position or a right-turn indication position, and a left-turn indication or a right turn indication is output from the input operating apparatus 1.

The input operating apparatus 1 is mounted in the steering column of the automobile. The steering shaft (not illustrated) is disposed on the opposite side to a side toward which the operating lever 7 projects. As the operating lever 7 is operated and a steering operation is performed, the cancel lever 4 included in the input operating apparatus 1 is moved in accordance with a movement of the cancel cam member 6 that is moved together with the steering shaft.

Regarding rotating operations of the operating lever 7 in the A3 direction and the A4 direction, desired functions can be assigned in accordance with operating directions. For example, the rotating operations can be set as follows: the rotating operation in the A4 direction can be latched, and the function of switching a head light to a high beam is assigned to the rotating operation in the A4 direction; and the rotating operation in the A3 direction is automatically returned without being latched, and the function of turning on the head light only when the operating lever 7 is operated is assigned to the rotating operation in the A3 direction.

As illustrated in FIG. 3, the operating lever 7 includes the base 20 and an operating portion (not illustrated). The base 20 is a base side of the operating lever 7 and housed in the housing 2. The operating portion is exposed to the cabin and to be operated by the driver.

The housing 2 is formed by integrating the upper casing 30 and the lower casing 33 with each other with a space formed therein. Components such as the base 20 of the operating lever 7 are housed in the space in the housing 2. Main components housed in the housing 2 include the holding body 3, the cancel lever 4, a cam member 5, a drive body 10, and a swing lever 15.

The holding body 3 includes a box-shaped main body 40. The main body 40 allows the base 20 of the operating lever 7 to be inserted thereinto and to be exposed on the cam member 5 side. The main body 40 includes a projecting surface portion 41 that projects toward the steering shaft side and a guide projection 44 that projects from an upper surface of the main body 40.

The guide projection 44 is rotatably supported by the upper casing 30 of the housing 2. Here, since the holding body 3 is rotatably supported by the housing 2 about the guide projection 44, the projecting surface portion 41 of the holding body 3 is rotated in a B1 direction or a B2 direction when the operating lever 7 is operated to rotate in the A1 direction or A2 direction. The base 20 is rotatably supported by the holding body 3 about a shaft 22 inserted through a shaft insertion portion 20b formed in the base 20 and a shaft insertion portion 48 formed in the holding body 3. Thus, when the operating lever 7 is operated so as to rotate in the A3 direction or A4 direction, only the operating lever 7 is rotated without rotating the holding body 3.

An engaging surface 42 is formed on a lower surface side at an end portion of the projecting surface portion 41 of the holding body 3. The engaging surface 42 is engaged with and disengaged from an engaging projection 53 provided on the cancel lever 4. The details of the engaging surface 42 and the engaging projection 53 will be described later.

Furthermore, as illustrated in FIG. 6, a drive portion 41a is provided on a lower surface (surface on the Z2 side) of the projecting surface portion 41. The drive portion 41a is brought into engagement with the cancel lever 4 when a cancel operation is performed.

As illustrated in FIG. 3, the drive body 10 is slidably attached to an accommodating recess (not illustrated) of the base 20 of the operating lever 7 with an elastic member 11 interposed between the drive body 10 and the accommodating recess. The drive body 10 is elastically urged so that a tip end portion 10a is pressed against the cam member 5 that faces the base 20.

The tip end portion 10a of the drive body 10 is guided by the cam member 5 and slides in four directions as the operating lever 7 is operated to rotate. That is, a crisscross cam groove (not illustrated) corresponding to the operating directions of the operating lever 7 is formed in a cam surface portion (not illustrated) of the cam member 5 facing the base 20.

The cam groove is recessed most at a central portion thereof corresponding to a neutral position of the operating lever 7. The cam groove is defined by inclined surfaces formed from the central portion toward peripheral directions. The drive body 10 is elastically pressed against the cam groove. Thus, when the tip end portion 10a exists one of the inclined surfaces as a result of rotating operation of the operating lever 7 in one of the four directions, the operating lever 7 is elastically urged in a direction in which the operating lever 7 is automatically returned to the neutral position due to the elastically urging force of the elastic member 11.

Furthermore, the engaging projection 53 stands erect at an intermediate position between a first arm 55a and a second arm 55b on an upper surface of the cancel lever 4. As illustrated in FIG. 3, the cancel lever 4 is attached to the lower casing 33 with an elastic member 14 interposed therebetween.

As illustrated in FIGS. 3 and 5, the elongated guide hole 35 is formed in the lower casing 33 of the housing 2. The elongated guide hole 35 guides a connecting portion 57 of the cancel lever 4 illustrated in FIG. 7 such that the connecting portion 57 can be advanced toward and retracted from the steering shaft side, that is, the rotational path of the cancel projection 6a side. Thus, the connecting portion 57 of the cancel lever 4 is guided by the elongated guide hole 35 such that the connecting portion 57 can be advanced and retracted in the C3 direction and the C4 direction, and the cancel lever 4 is rotatable in the C1 direction or the C2 direction illustrated in FIG. 3 about the connecting portion 57 at a desired position in the elongated guide hole 35.

The cancel lever 4 is constantly elastically urged toward the steering shaft by the elastic member 14 attached to the housing 2. The elastic member 14 includes, for example, a coil spring.

As illustrated in FIG. 3, the lower casing 33 of the housing 2 has an opening 34 and a guide projection 37. The opening 34 allows a connecting portion 15b extending downward from the swing lever 15 to be inserted therethrough. The guide projection 37 supports the holding body 3 in the rotating direction. A support shaft 15a of the swing lever 15 is swingably supported by a bearing 45 of the holding body 3. Thus, when the operating lever 7 is operated so as to be rotated in the A3 direction or the A4 direction illustrated in FIG. 3, the swing lever 15 swings in a D1 direction or a D2 direction illustrated in FIG. 3.

As illustrated in FIG. 3, the connecting portion 15b is engaged with a swing member 18 so as to swing the swing member 18. The swing member 18 is disposed on the lower side of the opening 34 of the lower casing 33. A rotational center 18a of the swing member 18 is swingably supported by the lower casing 33, and an arc-shaped engaging portion 18c of the swing member 18 is engaged with the connecting portion 15b. A projection (not illustrated) of the engaging portion 18c formed at an end portion on the opposite side to the rotational center 18a is inserted into an elongated hole 16a formed in a first slider 16. Thus, the first slider 16 can slide in an E1 and E2 directions illustrated in FIG. 3 by the swing member 18 that rotates as the swing lever 15 swings.

As illustrated in FIG. 3, a first contact 19a and a second contact 19b are disposed on the base plate 19. The first slider 16 includes a contact (not illustrated) to be in contact with the first contact 19a. As the swing lever 15 swings in the D1 direction or the D2 direction, the first slider 16 slides in the E1 direction or the E2 direction. This sliding of the first slider 16 allows a contact state of the contact of the first slider 16 with the first contact 19a to be switched.

As illustrated in FIG. 3, a second slider 17 is provided on the base plate 19. The second slider 17 slides as the holding body 3 rotates. As illustrated in FIGS. 6 and 7, a connecting pin 43 formed on a lower surface of the holding body 3 is inserted through an elongated hole 17a formed in the second slider 17. Thus, when the holding body 3 rotates in the B1 direction or the B2 direction, the second slider 17 slides in an F1 direction or an F2 direction illustrated in FIG. 3.

The second slider 17 includes a contact (not illustrated) to be in contact with the second contact 19b. Sliding of the second slider 17 in the F1 direction or the F2 direction allows a contact state of the contact of the second slider 17 with the second contact 19b to be switched.

As illustrated in FIG. 3, the drive body 10 is supported on the steering shaft side (left side in FIG. 3) of the base 20 of the operating lever 7 with the elastic member 11 interposed between the drive body 10 and the base 20. As illustrated in FIG. 3, an end portion of the base 20 of the operating lever 7 and the tip end portion 10a of the drive body 10 project from the holding body 3 toward the cam member 5. Furthermore, the tip end portion 10a of the drive body 10 is in contact with a cam surface (not illustrated) of the cam member 5.

The tip end portion 10a of the drive body 10 is in contact with a position on the cam surface of the cam member 5 in accordance with the orientation of the operating lever 7. For example, operating input of turning on/off of the high beam of the head light, left-turn indication, or right-turn indication is performed depending on this position on the cam surface.

The cancel lever 4 is held by the lower casing 33 of the housing 2 with the elastic member 14 interposed therebetween. Such a structure allows the cancel lever 4 to be easily reliably rotated and to be easily reliably advanced toward and retracted from the rotational path of the cancel projection 6a with a simpler structure. Accordingly, the reliability of the input operating apparatus 1 can be improved, and the size of the input operating apparatus 1 can be further reduced.

When the operating lever 7 is at the neutral position, the engaging projection 53 formed on the upper surface of the cancel lever 4 and the engaging surface 42 of the holding body 3 are engaged with each other. The vertex of the engaging projection 53 and the vertex of the engaging surface 42 are in contact with each other, and the cancel lever 4 is retracted out of the rotational path of the cancel projection 6a with the elastic member 14 further compressed. Accordingly, the cancel lever 4 is elastically urged toward the rotational path of the cancel projection 6a with a larger force.

The Cancel Lever 4

The cancel lever 4 is described in detail below.

Figure 8:
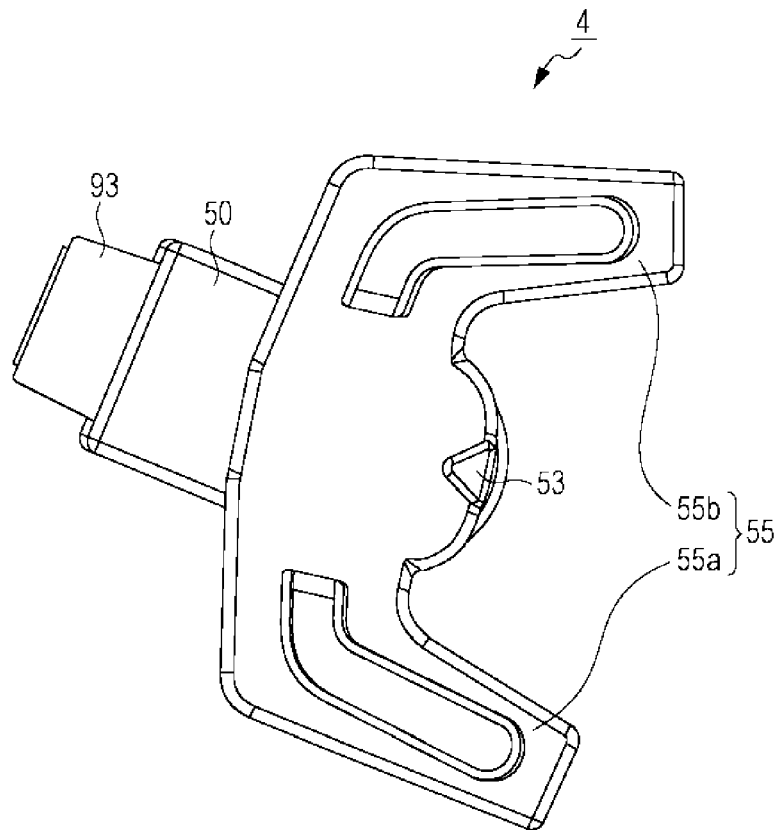
FIG. 8 is a plan view of a cancel lever illustrated in, for example, FIG. 3 seen from the Z1 direction toward the Z2 direction.
Figure 9:
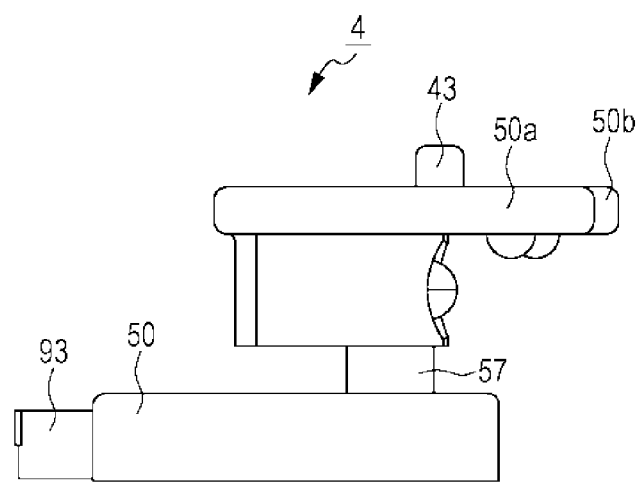
FIG. 9 is a side view of the cancel lever illustrated in, for example, FIG. 3 seen from the Y1 direction toward the Y2 direction.
Figure 10:
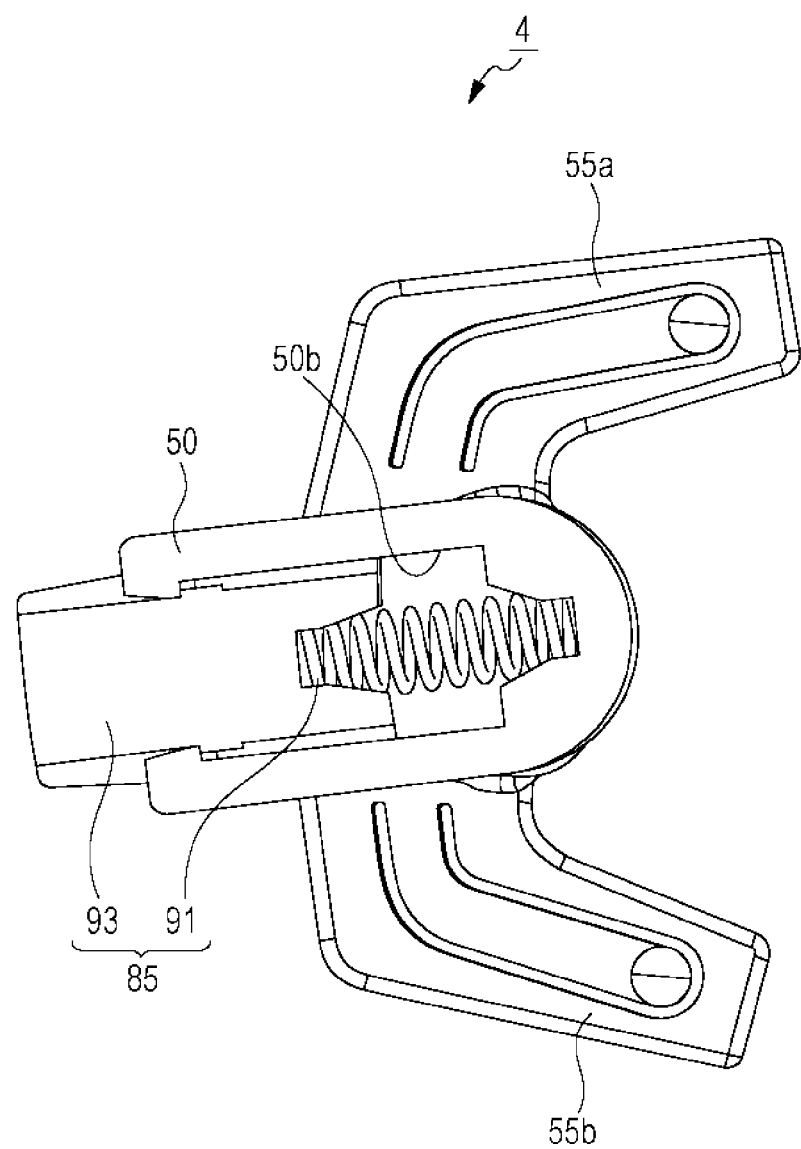
FIG. 10 is a bottom view of the cancel lever illustrated in, for example, FIG. 3 seen from the Z2 direction toward the Z1 direction.

FIG. 8 is a plan view of the cancel lever 4 illustrated in, for example, FIG. 3 seen from the Z1 direction toward the Z2 direction. FIG. 9 is a side view of the cancel lever 4 illustrated in, for example, FIG. 3 seen from the Y1 direction toward the Y2 direction. FIG. 10 is a bottom view of the cancel lever 4 illustrated in, for example, FIG. 3 seen from the Z2 direction toward the Z1 direction.

Preferably, the cancel lever 4 is rotatably attached to the lower casing 33 about a second virtual rotational axis O2 illustrated in, for example, FIGS. 6 and 7, which is a rotational center of the connecting portion 57. Preferably, the cancel lever 4 is rotatable from the neutral position to at least a left-turn indication rotational position and a right-turn indication rotational position.

Preferably, as illustrated in FIG. 8, the cancel lever 4 includes a first engaging portion 50, a second engaging portion 55, and the connecting portion 57.

As illustrated in FIG. 3, the cancel lever 4 is attached to the lower casing 33 with the elastic member 14 interposed therebetween and constantly urged toward the cancel cam member 6.

Preferably, the first engaging portion 50 projects toward the rotational path of the cancel projection 6a and is advanced toward and retracted from the rotational path of the cancel projection 6a. The first engaging portion 50 is engageable with the cancel projection 6a.

The second engaging portion 55 includes the first arm 55a and the second arm 55b that project toward the operating lever 7 side. Preferably, the second engaging portion 55 is engaged with the holding body 3.

The connecting portion 57 extends in the second virtual rotational axis O2 direction and, preferably, connects the first engaging portion 50 and the second engaging portion 55 to each other. That is, the first engaging portion 50 and the second engaging portion 55 are provided at different positions in the second virtual rotational axis O2 direction, and a region where the first engaging portion 50 and the second engaging portion 55 are superposed on each other extends in the perpendicular direction to the second virtual rotational axis O2 direction. Thus, even when the distance between the cancel cam member 6 and the cancel lever 4 is reduced, the distance required for advancing and retracting the cancel lever 4 can be sufficiently ensured, and size reduction can be achieved. This allows the distance between the cancel cam member 6 and the operating lever 7 to be reduced.

The cancel lever 4 is rotated about the second virtual rotational axis O2 when the cancel operation is performed. During the rotation of the cancel lever 4, the cancel lever 4 is brought into engagement (contact) with the drive portion 41a on the lower surface of the projecting surface portion 41 of the holding body 3, thereby rotating the holding body 3 so as to automatically return the operating lever 7 from the left-turn indication rotational position or the right-turn indication rotational position to the neutral position.

Furthermore, the second engaging portion 55 is closer to the holding body 3 than the first engaging portion 50 in the cancel lever 4. Thus, the second engaging portion 55 can be disposed close to the holding body 3. This allows an engagement structure of the second engaging portion 55 and the holding body 3 to be realized with a simple and small-sized structure.

As illustrated in FIGS. 3 and 5, the connecting portion 57 is guided by the elongated guide hole 35 formed in the lower casing 33 so as to be advanced toward and retracted from the rotational path of the cancel projection 6a of the cancel cam member 6. At this time, the connecting portion 57 is guided by the elongated guide hole 35 so as to allow the cancel lever 4 to be rotated about the connecting portion 57.

With this structure that includes the elongated guide hole 35 formed in the lower casing 33, a separate guide portion is not required. Thus, size reduction can be achieved.

Furthermore, as illustrated in FIG. 2, the first engaging portion 50 is positioned outside the lower casing 33. In contrast, the second engaging portion 55 is disposed in the housing 2.

As described above, the elongated guide hole 35 that guides the connecting portion 57 is provided in the lower casing 33. Thus, the first engaging portion 50 can be provided outside the lower casing 33 with a simple structure. Furthermore, since the first engaging portion 50 is provided outside the lower casing 33, the size of the housing 2 can be reduced.

As illustrated in FIG. 5, the first virtual rotational axis O1 exists at a position separated from the position of the first virtual line 35a which passes through a path through which the cancel lever 4 is advanced and retracted (in the longitudinal direction of the elongated guide hole 35).

Thus, even when the distance between the cancel cam member 6 and the cancel lever 4 is reduced, the distance required for advancing and retracting the cancel lever 4 can be sufficiently ensured, and size reduction can be achieved. This allows the distance between the cancel cam member 6 and the operating lever 7 to be reduced.

Preferably, as illustrated in FIG. 6, the first engaging portion 50 of the cancel lever 4 is line symmetric about a second virtual line 50a which passes through the first virtual rotational axis O1 of the cancel cam member 6 and the second virtual rotational axis O2 of the cancel lever 4.

Accordingly, when the cancel operation is performed, the first engaging portion 50 can be brought into contact with the cancel projection 6a in the same manner in both clockwise and counterclockwise rotations. Thus, the cancel operation can be reliably performed in both the clockwise and counterclockwise rotations.

Preferably, as illustrated in FIG. 5, a third virtual rotational axis O3 of the holding body 3 is positioned on the first virtual line 35a which is an axis of the elongated guide hole 35. The axis of the elongated guide hole 35 is the path through which the cancel lever 4 is advanced and retracted.

Preferably, at the neutral position illustrated in FIG. 6, the drive portion 41a of the projecting surface portion 41 of the holding body 3, which is brought into contact with the first arm 55a and the second arm 55b of the second engaging portion 55 of the cancel lever 4 when the cancel operation is performed, is positioned on the first virtual line 35a that passes through a path through which the first engaging portion 50 is advanced and retracted.

Accordingly, when the cancel operation is performed, the cancel lever 4 can drive the operating lever 7 through the holding body 3 in the same state in both the clockwise and counterclockwise rotations. Thus, the clockwise and counterclockwise cancel operations can be reliably performed.

Preferably, as illustrated in FIGS. 6 and 7, the first engaging portion 50 faces the cancel projection 6a with a gap therebetween and is positioned out of the rotational path of the cancel projection 6a in a neutral state in which the cancel projection 6a is positioned in the movement path of the first engaging portion 50.

In contrast, as illustrated in, for example, FIGS. 12 and 15, which will be described later, the first engaging portion 50 is positioned in the rotational path of the cancel projection 6a in a non-neutral state in which the cancel projection 6a is not positioned in the movement path of the first engaging portion 50.

Preferably, as illustrated in, for example, FIGS. 13 and 16, which will be described later, when the state changes from the non-neutral state from the neutral state, the first engaging portion 50 is pressed by the cancel projection 6a, thereby the cancel lever 4 is rotated. This rotation of the cancel lever 4 causes the second engaging portion 55 to press the holding body 3, thereby returning the holding body 3 (operating lever 7) to the neutral position.

With this structure, when the first engaging portion 50 of the cancel lever 4 is brought into engagement with the cancel projection 6a, in conjunction with this engaging movement, the second engaging portion 55 can reliably return the holding body 3 to the neutral position.

The Anti-Cancel Jam Mechanism

The anti-cancel jam mechanism is described. The anti-cancel jam mechanism prevents damage due to an overload produced between the cancel cam member 6 and the cancel lever 4 when the steering wheel is rotated while the operating lever 7 having been operated is held (locked) by a hand or the like (while the rotation of the holding body 3 is regulated).

Preferably, as illustrated in, for example, FIG. 6, an anti-cancel jam mechanism 85 is provided in the first engaging portion 50 of the cancel lever 4.

The anti-cancel jam mechanism 85 moves the cancel lever 4 in a direction in which the cancel lever 4 is retracted from the rotational path of the cancel projection 6a when the cancel cam member 6 is rotated, and the cancel lever 4 receives a rotational force from the cancel projection 6a while the rotation of the holding body 3 is regulated by the operating lever 7.

According to the present embodiment, the anti-cancel jam mechanism 85 is provided in the cancel lever 4 instead of in the holding body 3. This can simplify the structure of the holding body 3 and reduce the size of the structure of the holding body 3. Furthermore, the above-described anti-cancel jam mechanism 85 is provided in the cancel lever 4 that is positioned near the housing 2 and outside the housing 2. Compared to the case where the anti-cancel jam mechanism 85 is provided in the holding body 3, this can increase ease of assembly and reduce the production cost.

As illustrated in, for example, FIGS. 4, 6, and 10, the anti-cancel jam mechanism 85 is provided in the first engaging portion 50. Preferably, the anti-cancel jam mechanism 85 includes, for example, an elastic member 91 and a moving body 93.

Preferably, in the anti-cancel jam mechanism 85, the moving body 93 (engaging portion with the cancel projection) is slidably accommodated in an accommodating space 50b formed in a surface of the first engaging portion 50 on the Z2 side illustrated in FIG. 3 with an end of the moving body 93 projecting toward the cancel cam member 6.

The moving body 93 of the anti-cancel jam mechanism 85 is incorporated in the first engaging portion 50 (cancel lever main body) with the elastic member 91 interposed therebetween.

Preferably, after a left turn or a right turn has been performed, when the steering wheel is returned to a state which the steering wheel had been in before the left turn or the right turn has been performed and the cancel projection 6a is brought into contact with the first engaging portion 50 positioned in the rotational path of the cancel projection 6a, the rotational force is applied to the first engaging portion 50. When this occurs while the rotation of the holding body 3 is regulated by locking the operating lever 7 with a finger or the like, the moving body 93 is moved in the direction retracting from the rotational path of the cancel projection 6a against an elastic force of the elastic member 91.

As described above, the anti-cancel jam mechanism 85 is realized by holding the moving body 93 in the first engaging portion 50 with the elastic member 91 interposed therebetween. Accordingly, a unit for realizing the anti-cancel jam mechanism 85 can be incorporated in the cancel lever 4 in advance. This can increase ease of assembly and reduce the production cost.

Preferably, as illustrated in, for example, FIG. 10, the moving body 93 is fitted into the accommodating space 50b by using a snap-in mechanism. This can increase ease of assembly and reduce the production cost.

Examples of operations of the input operating apparatus 1 are described below.

FIG. 6 and FIGS. 11 to 18 illustrate the positional relationships between the cancel cam member 6, the cancel lever 4, the holding body 3, and the operating lever 7 when the input operating apparatus 1 is seen from the Z2 side illustrated in FIG. 3. It should be noted that, since the input operating apparatus 1 is seen from the Z2 side, that is, from the opposite side in each of these drawings, the directions of arrows in these drawings are opposite to those in description in terms of the clockwise and counterclockwise directions.

As has been described, the operating lever 7 is at the neutral position in FIG. 6.

Normal Operations (for a Right Turn)

Operations of the input operating apparatus 1 for a right turn with the operating lever 7 not locked are described below.

Figure 11:
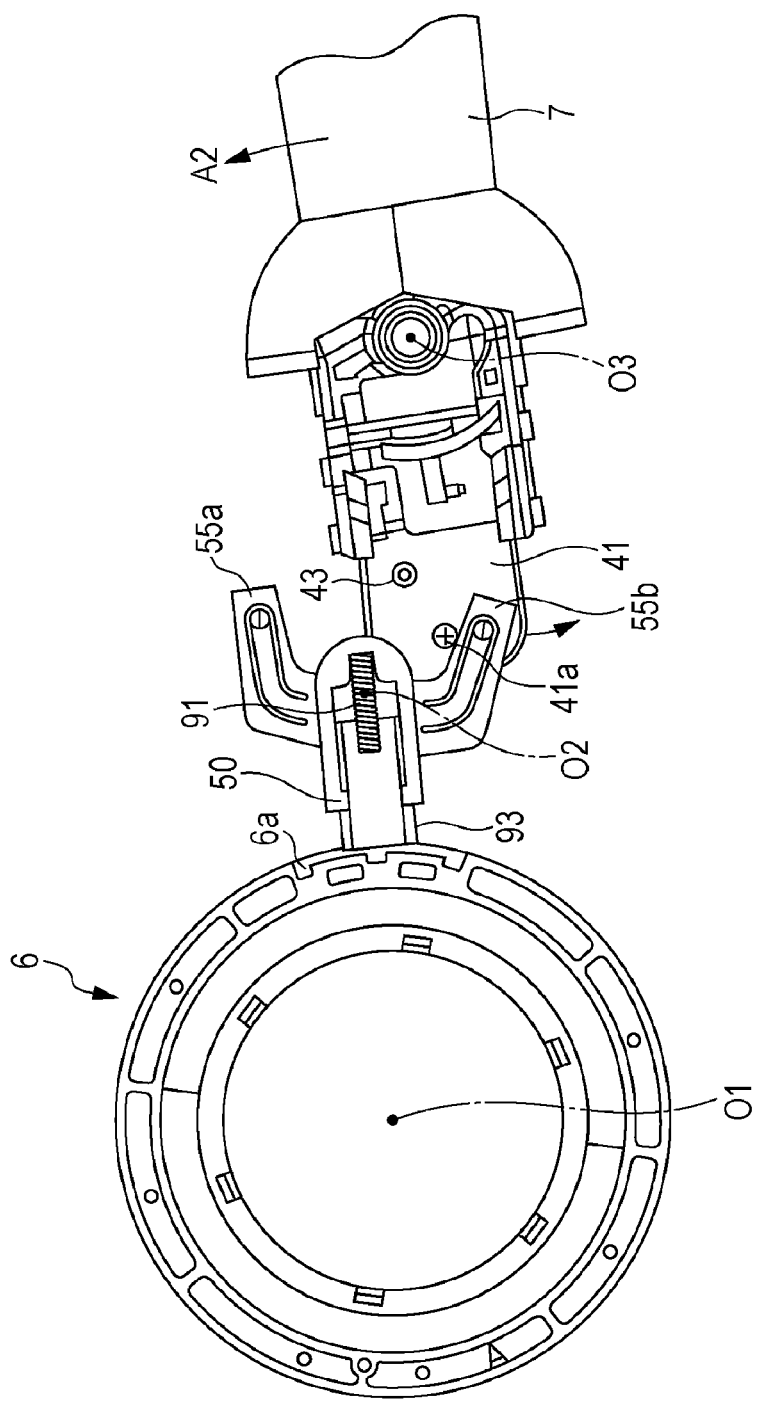
FIG. 11 illustrates a state in which an operating lever that is not locked is set at a right-turn indication position.

FIG. 11 illustrates a state in which the operating lever 7 is set at a right-turn indication position. FIG. 12 illustrates a state in which the steering wheel is rotated clockwise following the state illustrated in FIG. 11. FIG. 13 illustrates a process in which the steering wheel having been rotated clockwise for a right turn is returned by being rotated counterclockwise.

As illustrated in FIG. 11, for a right turn, the operator rotates the operating lever 7 in an arrow A2 direction with, for example, his or her finger. This rotation of the operating lever 7 causes the drive portion 41a of the holding body 3 to approach the second arm 55b of the cancel lever 4. In the state illustrated in FIG. 11, the moving body 93 of the first engaging portion 50 of the cancel lever 4 is in contact with the cancel projection 6a of the cancel cam member 6 and positioned out of the rotational path of the cancel projection 6a.

Figure 12:
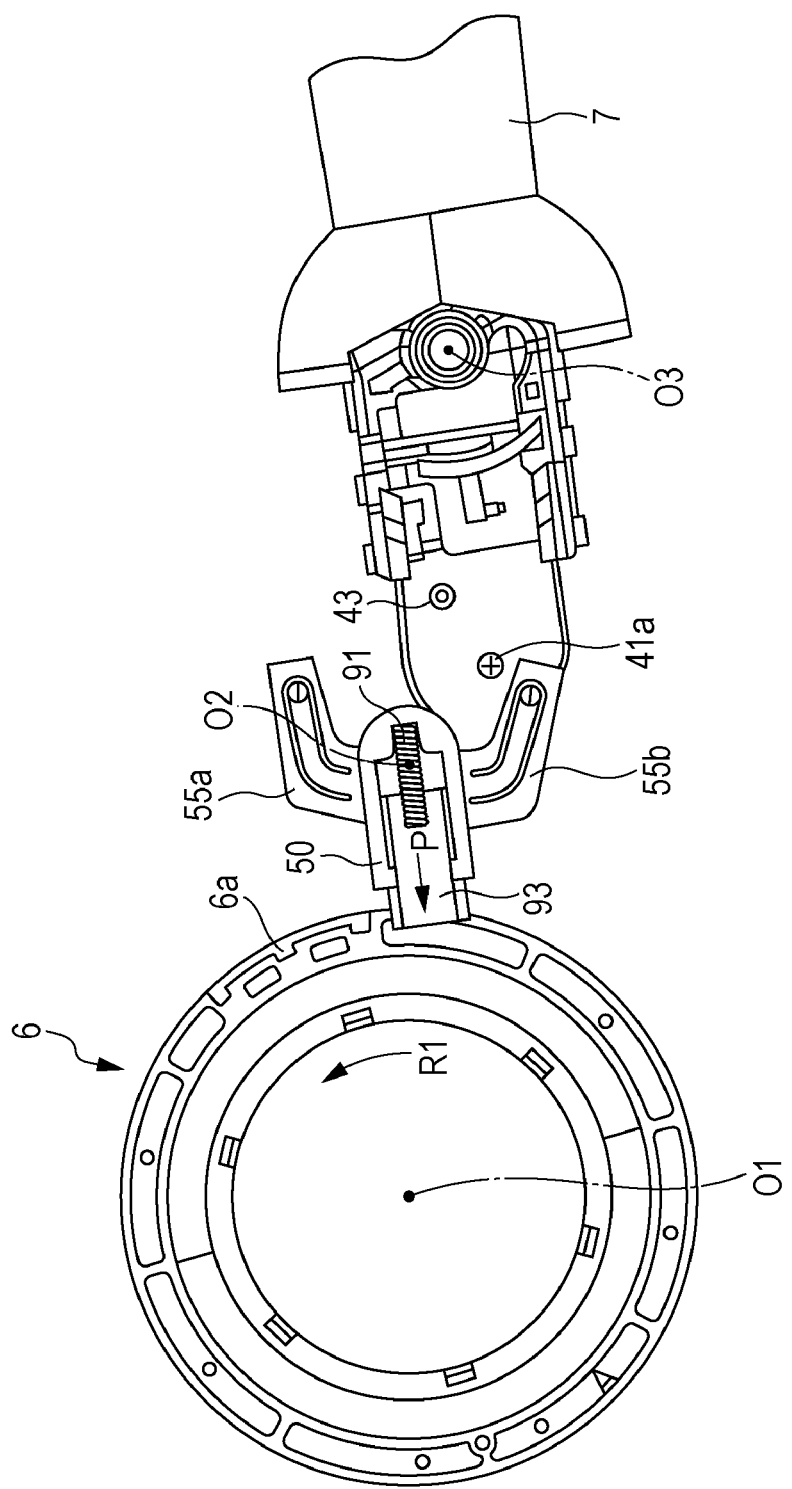
FIG. 12 illustrates a state in which a steering wheel is rotated clockwise following the state illustrated in FIG. 11.

Next, as illustrated in FIG. 12, when the steering wheel is rotated clockwise, the cancel cam member 6 is rotated in an arrow R1 direction illustrated in FIG. 12. As a result, cancel projection 6a is moved out of the path through which the cancel lever 4 is advanced and retracted, the cancel lever 4 is moved in the arrow P direction along the elongated guide hole 35 toward the cancel cam member 6 due to an urging force of the elastic member 14 illustrated in FIG. 3, and the moving body 93 is positioned in the rotational path of the cancel projection 6a.

Figure 13:
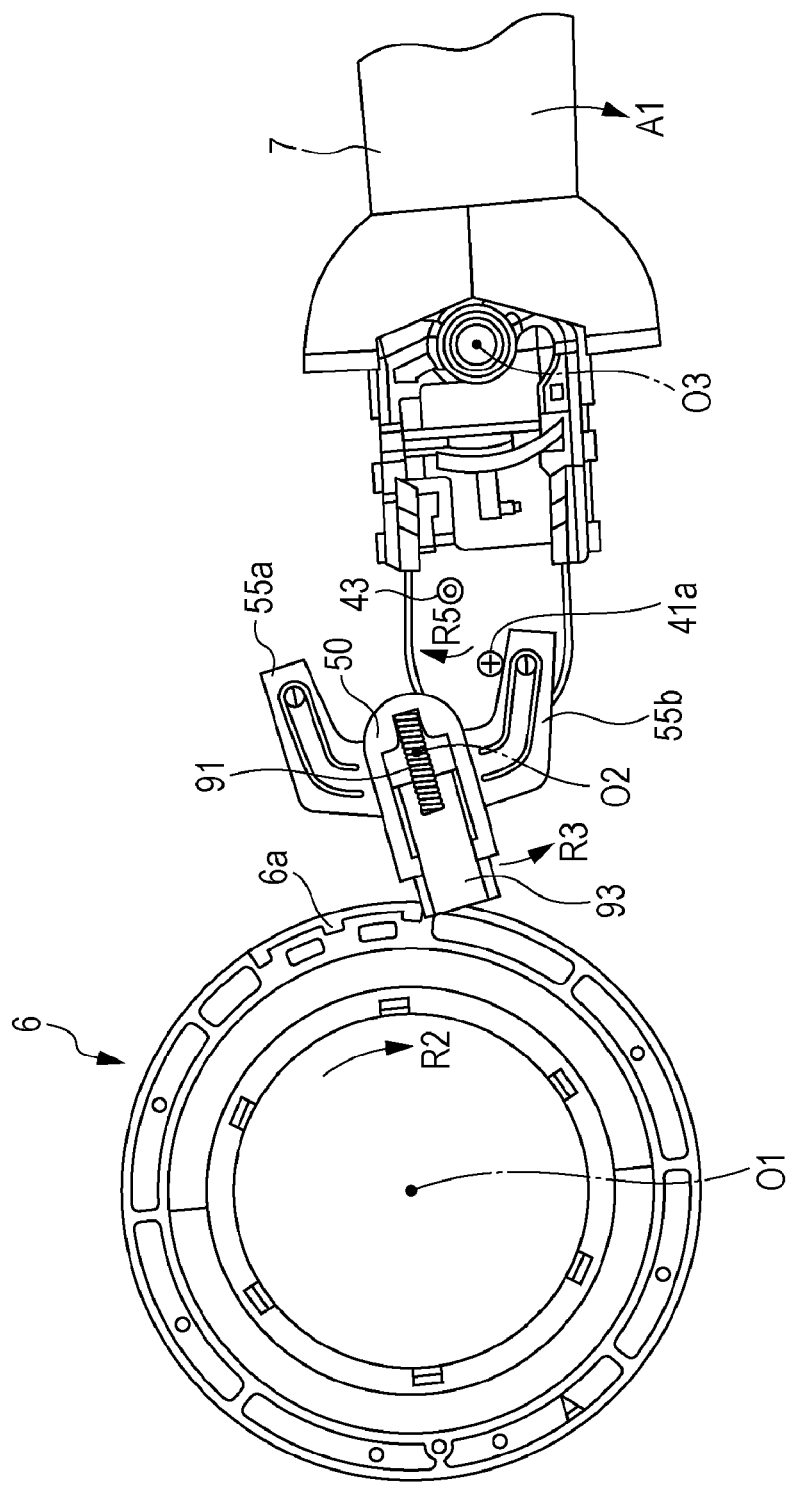
FIG. 13 illustrates a process in which the steering wheel having been rotated clockwise for a right turn is returned by being rotated counterclockwise.

Next, as illustrated in FIG. 13, when the steering wheel having been rotated clockwise for the right turn is returned by being rotated counterclockwise, the cancel cam member 6 is rotated in an arrow R2 direction illustrated in FIG. 13. In this process, an end portion of the cancel projection 6a presses a side surface of the moving body 93 in the arrow R2 direction, thereby rotating the cancel lever 4 in an arrow R3 direction illustrated in FIG. 13 about the second virtual rotational axis O2. As a result, the second arm 55b presses the drive portion 41a in an arrow R5 direction, thereby rotating the operating lever 7 in an arrow A1 direction illustrated in FIG. 13 about the virtual rotational axis O3 so as to return the operating lever 7 to the neutral position illustrated in FIG. 6.

Normal Operations (for a Left Turn)

Operations of the input operating apparatus 1 for a left turn with the operating lever 7 not locked are described below.

Figure 14:
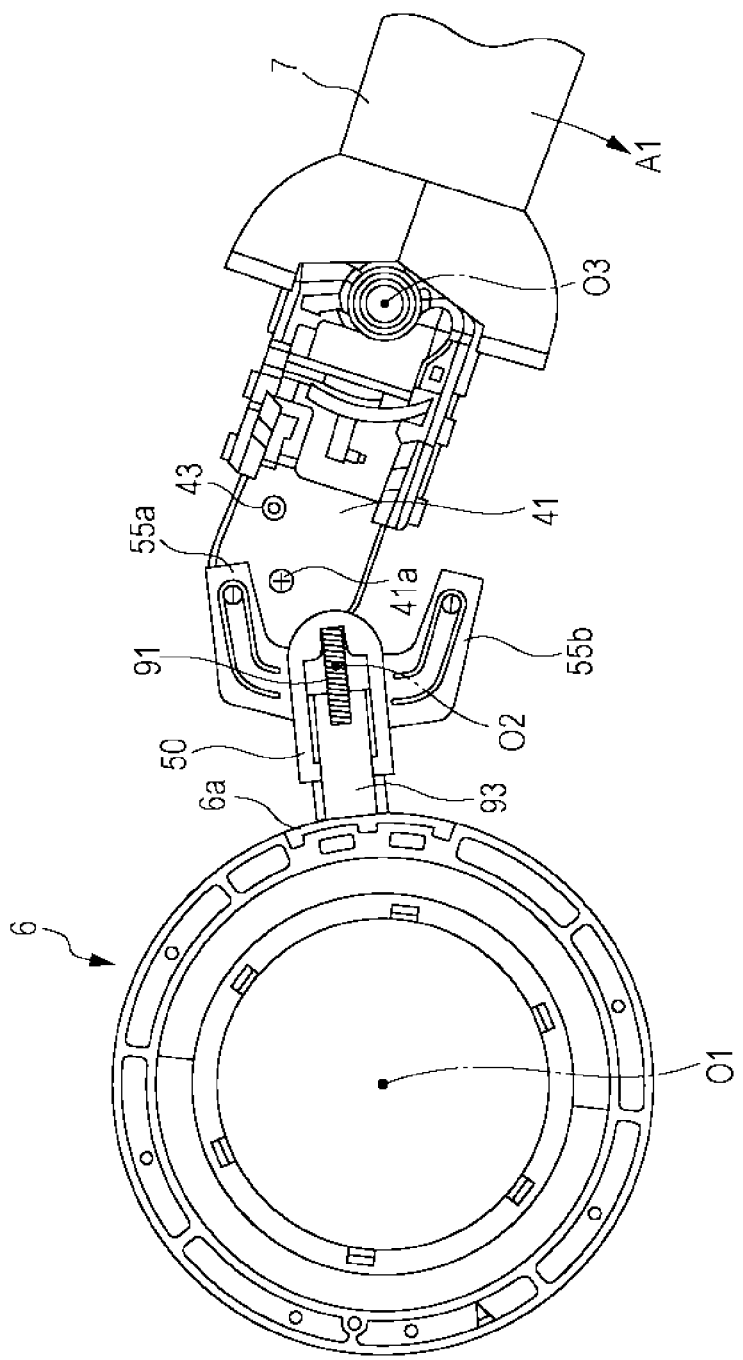
FIG. 14 illustrates a state in which the operating lever that is not locked is set at a left-turn indication position.

FIG. 14 illustrates a state in which the operating lever 7 is set at a left-turn indication position. FIG. 15 illustrates a state in which the steering wheel is rotated counterclockwise following the state illustrated in FIG. 14. FIG. 16 illustrates a process in which the steering wheel having been rotated counterclockwise for a left turn is returned by being rotated clockwise.

As illustrated in FIG. 14, for a left turn, the operator rotates the operating lever 7 in the arrow A1 direction with, for example, his or her finger. This rotation of the operating lever 7 causes the drive portion 41a of the holding body 3 to approach the first arm 55a of the cancel lever 4. In the state illustrated in FIG. 14, the moving body 93 of the first engaging portion 50 of the cancel lever 4 is in contact with the cancel projection 6a of the cancel cam member 6 and positioned out of the rotational path of the cancel projection 6a.

Figure 15:
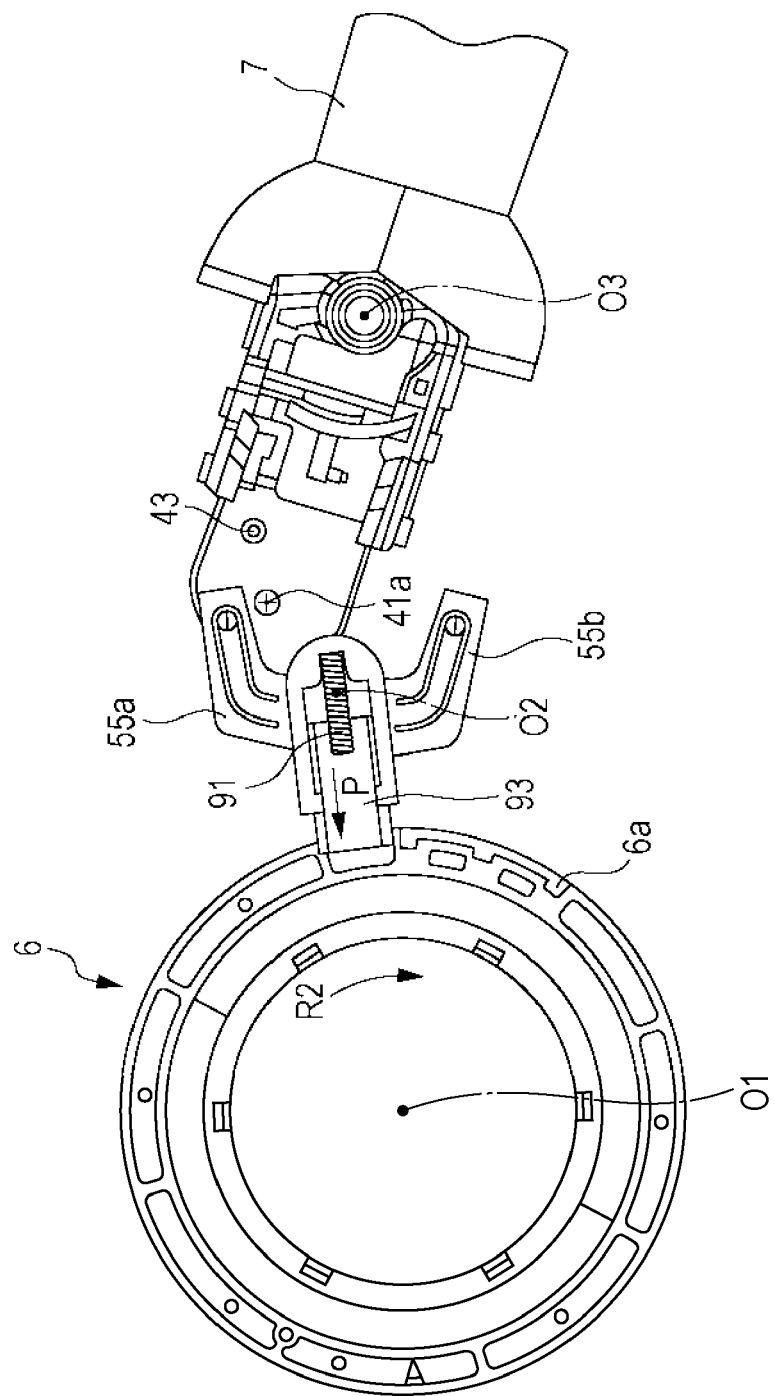
FIG. 15 illustrates a state in which the steering wheel is rotated counterclockwise following the state illustrated in FIG. 14.

Next, as illustrated in FIG. 15, when the steering wheel is rotated counterclockwise, the cancel cam member 6 is rotated in the arrow R2 direction illustrated in FIG. 15. As a result, the cancel projection 6a is moved out of the path through which the cancel lever 4 is advanced and retracted, the cancel lever 4 is moved in the arrow P direction along the elongated guide hole 35 toward the cancel cam member 6 due to an urging force of the elastic member 14 illustrated in FIG. 3, and the moving body 93 is positioned in the rotational path of the cancel projection 6a.

Figure 16:
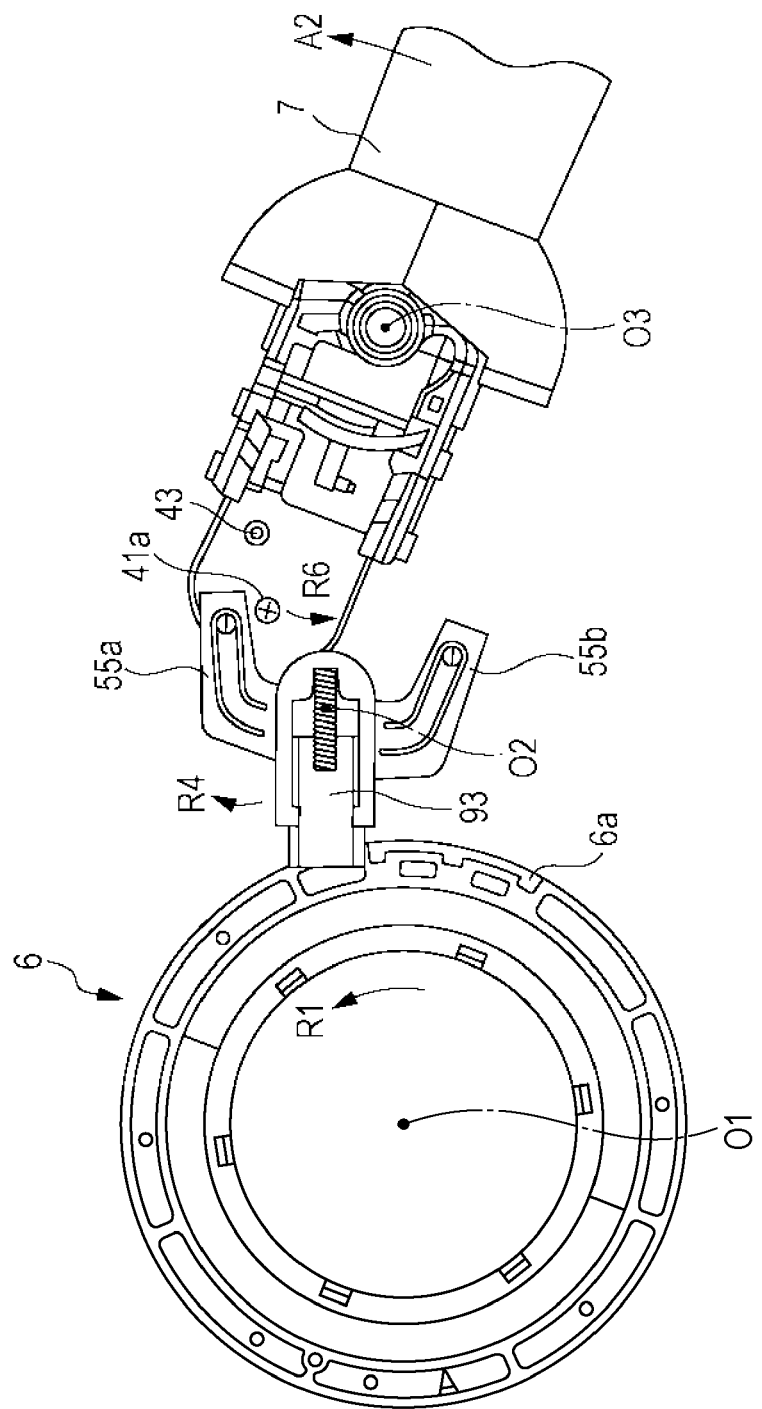
FIG. 16 illustrates a process in which the steering wheel having been rotated counterclockwise for a left turn is returned by being rotated clockwise.

Next, as illustrated in FIG. 16, when the steering wheel having been rotated counterclockwise for the left turn is returned by being rotated clockwise, the cancel cam member 6 is rotated in the arrow R1 direction illustrated in FIG. 16. In this process, an end portion of the cancel projection 6a presses a side surface of the moving body 93 in the arrow R1 direction, thereby rotating the cancel lever 4 in an arrow R4 direction illustrated in FIG. 16 about the second virtual rotational axis O2. As a result, the first arm 55a presses the drive portion 41a in an arrow R6 direction, thereby rotating the operating lever 7 in the arrow A2 direction illustrated in FIG. 16 about the virtual rotational axis O3 so as to return the operating lever 7 to the neutral position illustrated in FIG. 6.

Operations in Locked State (for a Right Turn)

Figure 17:
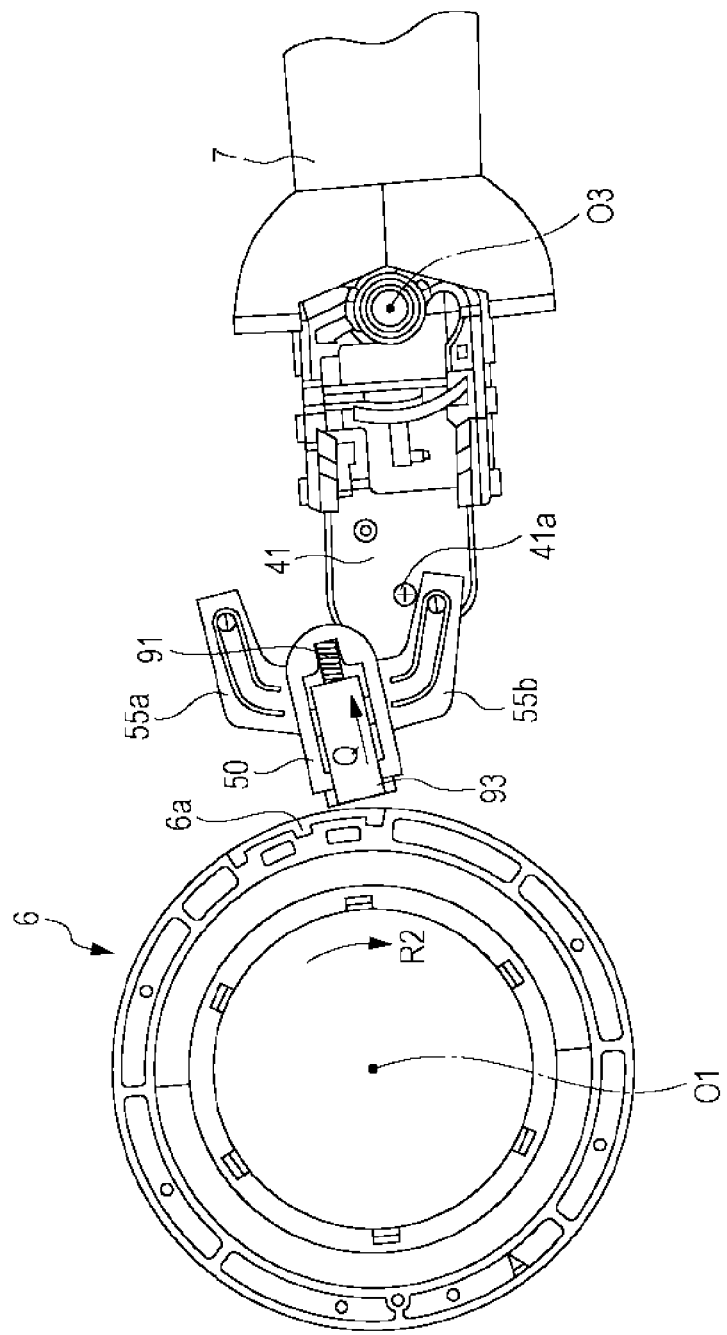
FIG. 17 illustrates an operation performed when the operating lever is locked with, for example, a finger at the start of operations in which the steering wheel having been rotated clockwise for a right turn is returned by being rotated counterclockwise as illustrated in FIG. 13.

Description below with reference to, for example, FIG. 17 is dedicated to operations performed when the operating lever 7 is locked with, for example, a finger at the start of the operations in which the steering wheel having been rotated clockwise for a right turn is returned by being rotated counterclockwise as illustrated in FIG. 13.

As illustrated in FIG. 13, when the steering wheel having been rotated clockwise for the right turn is returned by being rotated counterclockwise, the cancel cam member 6 is rotated in the arrow R2 direction illustrated in FIG. 13. In this process, although the end portion of the cancel projection 6a presses the side surface of the moving body 93 in the arrow R2 direction, the holding body 3 is not rotated because the operating lever 7 is locked. Accordingly, the cancel lever 4 is not rotated, and a pressure of a certain degree or larger is applied from the cancel projection 6a to the side surface of the moving body 93.

This causes the elastic member 91 to be pressed and contracted and the moving body 93 to be moved in an arrow Q direction (a direction of the elastic member 91, a retracting direction from the rotational path of the cancel projection 6a) as illustrated in FIG. 17 against an elastic force of the elastic member 91 so as to be out of the rotational path of the cancel projection 6a. Thus, the cancel cam member 6 is rotated.

With this structure, even in the case where the operating lever 7 is locked when making a right turn, damage due to an overload produced between the cancel cam member 6 and the cancel lever 4 can be prevented.

Operations in Locked State (for a Left Turn)

Figure 18:
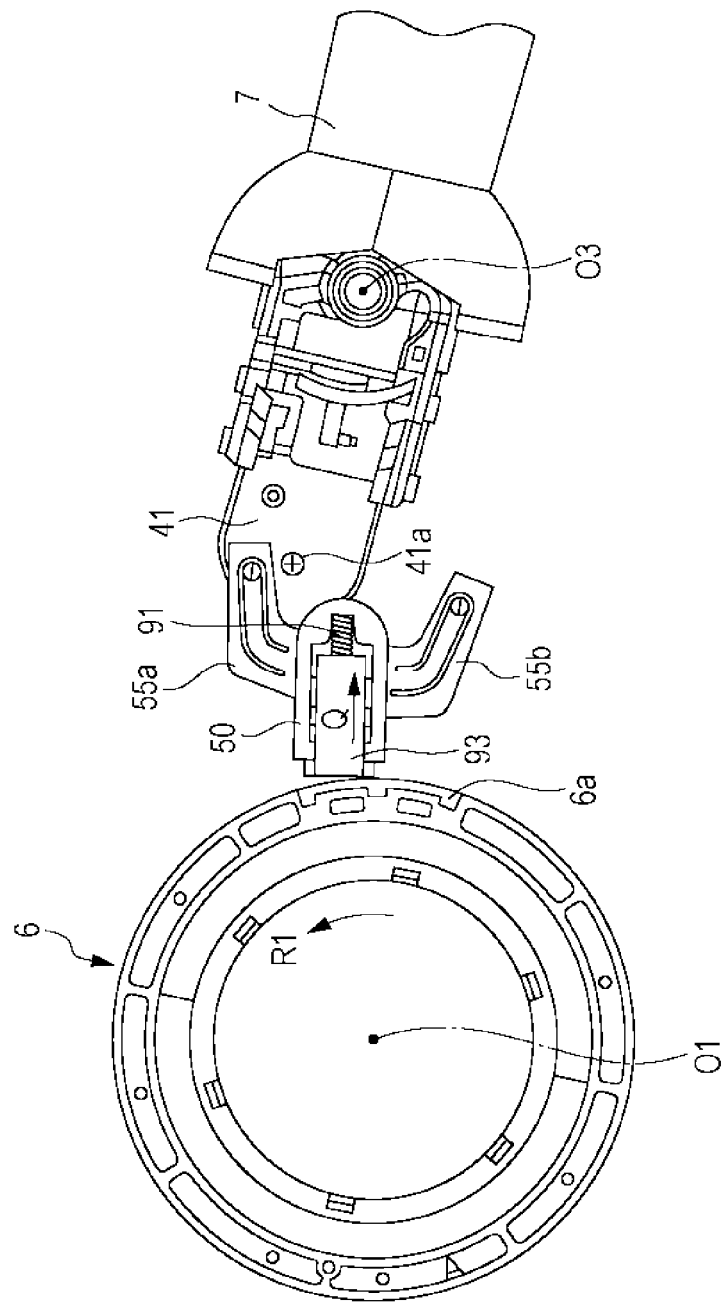
FIG. 18 illustrates an operation performed when the operating lever is locked with, for example, a finger at the start of operations in which the steering wheel having been rotated counterclockwise for a left turn is returned by being rotated clockwise as illustrated in FIG. 16.

Description below with reference to, for example, FIG. 18 is dedicated to operations performed when the operating lever 7 is locked with, for example, a finger at the start of the operations in which the steering wheel having been rotated counterclockwise for a left turn is returned by being rotated clockwise as illustrated in FIG. 16.

As illustrated in FIG. 16, when the steering wheel having been rotated counterclockwise for the left turn is returned by being rotated clockwise, the cancel cam member 6 is rotated in the arrow R1 direction illustrated in FIG. 16. In this process, although the end portion of the cancel projection 6a presses the side surface of the moving body 93 in the arrow R1 direction, the holding body 3 is not rotated because the operating lever 7 is locked. Accordingly, the cancel lever 4 is not rotated, and a pressure of a certain degree or larger is applied from the cancel projection 6a to the side surface of the moving body 93.

This causes the elastic member 91 to be pressed and contracted and the moving body 93 to be moved in the arrow Q direction (the direction of the elastic member 91, the retracting direction from the rotational path of the cancel projection 6a) as illustrated in FIG. 18 against the elastic force of the elastic member 91 so as to be out of the rotational path of the cancel projection 6a. Thus, the cancel cam member 6 is rotated.

With this structure, even in the case where the operating lever 7 is locked when making a left turn or a right turn, damage due to an overload produced between the cancel cam member 6 and the cancel lever 4 can be prevented.

As has been described, in the input operating apparatus 1, as illustrated in FIG. 5, the first virtual rotational axis O1 exists at a position separated from the position of the first virtual line 35a which passes through the path through which the cancel lever 4 is advanced and retracted (in the longitudinal direction of the elongated guide hole 35).

Thus, even when the distance between the cancel cam member 6 and the cancel lever 4 is reduced, the distance required for advancing and retracting the cancel lever 4 can be sufficiently ensured, and size reduction can be achieved.

This allows the distance between the cancel cam member 6 and the operating lever 7 to be reduced.

Also in the input operating apparatus 1, as illustrated in FIG. 6, the first engaging portion 50 of the cancel lever 4 is line symmetric about the second virtual line 50a which passes through the first virtual rotational axis O1 of the cancel cam member 6 and the second virtual rotational axis O2 of the cancel lever 4.

Accordingly, when the cancel operation is performed, the first engaging portion 50 can be brought into contact with the cancel projection 6a in the same manner in both clockwise and counterclockwise rotations. Thus, the cancel operation can be reliably performed in both the clockwise and counterclockwise rotations.

Also in the input operating apparatus 1, at the neutral position illustrated in FIG. 6, the drive portion 41a of the projecting surface portion 41 of the holding body 3, which is brought into contact with the first arm 55a and the second arm 55b of the second engaging portion 55 of the cancel lever 4 when the cancel operation is performed, is positioned on the first virtual line 35a that passes through a path through which the first engaging portion 50 is advanced and retracted.

Accordingly, when the cancel operation is performed, the cancel lever 4 can drive the operating lever 7 through the holding body 3 in the same state in both the clockwise and counterclockwise rotations. Thus, the clockwise and counterclockwise cancel operations can be reliably performed.

Also in the input operating apparatus 1, the cancel lever 4 is formed by connecting the first engaging portion 50 and the second engaging portion 55 to each other by the connecting portion 57 that extends in the second virtual rotational axis O2 direction. That is, the first engaging portion 50 and the second engaging portion 55 are provided at different positions in the second virtual rotational axis O2 direction, and a region where the first engaging portion 50 and the second engaging portion 55 are superposed on each other extends in the perpendicular direction to the second virtual rotational axis O2 direction. Thus, even when the distance between the cancel cam member 6 and the cancel lever 4 is reduced, the distance required for advancing and retracting the cancel lever 4 can be sufficiently ensured, and size reduction can be achieved. This allows the distance between the cancel cam member 6 and the operating lever 7 to be reduced.

The second engaging portion 55 is closer to the holding body 3 than the first engaging portion 50 in the cancel lever 4 of the input operating apparatus 1. Thus, the second engaging portion 55 can be disposed close to the holding body 3. This allows the engagement structure of the second engaging portion 55 and the holding body 3 to be realized with a simple and small-sized structure.

Also in the input operating apparatus 1, as illustrated in FIGS. 3 and 5, the connecting portion 57 of the cancel lever 4 is guided by the elongated guide hole 35 formed in the lower casing 33 so as to be advanced toward and retracted from the rotational path of the cancel projection 6a of the cancel cam member 6. At this time, the connecting portion 57 is guided by the elongated guide hole 35 so as to allow the cancel lever 4 to be rotated about the connecting portion 57.

With the elongated guide hole 35 formed in the lower casing 33 as described above, a separate guide portion is not required. Thus, size reduction can be achieved.

Furthermore, with the input operating apparatus 1, the elongated guide hole 35 that guides the connecting portion 57 is provided in the lower casing 33 as described above.

Thus, the first engaging portion 50 can be provided outside the lower casing 33 with a simple structure. Furthermore, since the first engaging portion 50 is provided outside the lower casing 33, the size of the housing 2 can be reduced.

Furthermore, the anti-cancel jam mechanism 85 is provided in the cancel lever 4 instead of in the holding body 3 in the input operating apparatus 1 as illustrated in, for example, FIG. 6. This can simplify the structure of the holding body 3 and reduce the size of the structure of the holding body 3. Furthermore, the above-described anti-cancel jam mechanism 85 is provided in the cancel lever 4 that is positioned near the housing 2 and outside the housing 2. Compared to the case where the anti-cancel jam mechanism 85 is provided in the holding body 3, this can increase ease of assembly and reduce the production cost.

As described above, the anti-cancel jam mechanism 85 is realized by holding the moving body 93 in the first engaging portion 50 with the elastic member 91 interposed therebetween. Accordingly, a unit for realizing the anti-cancel jam mechanism 85 can be incorporated in the cancel lever 4 in advance. This can increase ease of assembly and reduce the production cost.

Preferably, also in the input operating apparatus 1, as illustrated in, for example, FIG. 10, the moving body 93 is fitted into the accommodating space 50b by using a snap-in mechanism. This can increase ease of assembly and reduce the production cost.

The present invention is not limited to the above-described embodiment.

That is, those skilled in the art may make various changes in, various combinations of, various sub-combinations of, and various substitutions for the elements of the above-described embodiment within the technical scope of or within the scope of equivalents of the present invention.

Although the anti-cancel jam mechanism 85 is provided in the cancel lever 4 in the example according to the above-described embodiment, the anti-cancel jam mechanism may be provided in the holding body 3.

Also in the example according to the above-described embodiment, the first engaging portion 50 and the second engaging portion 55 are, as illustrated in FIG. 7, provided at different positions along the second virtual rotational axis O2. However, the first engaging portion 50 and the second engaging portion 55 may be provided at the same position along the second virtual rotational axis O2.

Furthermore, in the example according to the above-described embodiment, the input operating apparatus 1 exemplifies the input operating apparatus according to the present invention. However, the present invention can also be used to make any of other input operating apparatuses that include an operating lever, a holding body that supports a base of the operating lever such that the base is rotatable in one plane, a housing that supports the holding body such that the holding body is rotatable in another plane which intersects the one plane, and a cancel lever that is provided in the housing, movable as the holding body is rotated, rotatable, and can be advanced toward and retracted from a rotational path of a cancel projection provided on a steering shaft.

The present invention can be used to make an input operating apparatus that includes an operating lever.

What is claimed is:
1. An input operating apparatus comprising:
an operating lever;
a holding body that holds a base of the operating lever such that the base is rotatable in one plane;

a support body that supports the holding body such that the holding body is rotatable in another plane which intersects the one plane; and a cancel lever that is movable when the holding body is being rotated, wherein the cancel lever is rotatable about a second virtual rotational axis and the second virtual rotational axis is on a longitudinal path of a first virtual line along which the cancel lever is able to be advanced toward and retracted from a rotational path of a cancel projection which is rotated about a first virtual rotational axis together with a steering shaft, wherein the first virtual rotational axis is at a position separated from a position of the first virtual line without intersecting the first virtual line.

2. The input operating apparatus according to claim 1, wherein the cancel lever is advanced toward and retracted from the rotational path of the cancel projection, the cancel lever is engageable with the cancel projection, and the cancel lever is rotatable about the second virtual rotational axis, and wherein an engaging portion of the cancel lever engageable with the cancel projection is line symmetric about a second virtual line which passes through the first virtual rotational axis and the second virtual rotational axis.

3. The input operating apparatus according to claim 1, wherein the operating lever is rotatable about a third virtual rotational axis, and wherein the third virtual rotational axis is positioned on the first virtual line which passes through the path through which the cancel lever is advanced and retracted.

4. The input operating apparatus according to claim 1, wherein a drive portion that is brought into contact with the cancel lever so as to drive a cancel operation of the operating lever is positioned on the first virtual line extending in a direction in which the cancel lever is advanced toward and retracted from the rotational path of the cancel projection.

5. The input operating apparatus according to claim 1, wherein the support body has a guide portion that guides the advancement and the retraction of the cancel lever.

6. The input operating apparatus according to claim 5, wherein the cancel lever includes:
　　a first engaging portion that is advanced toward and retracted from the rotational path of the cancel projection and that is engageable with the cancel projection,
　　a second engaging portion that is engaged with the holding body, and
　　a connecting portion that connects the first engaging portion and the second engaging portion to each other in a direction of the second virtual rotational axis, and wherein the guide portion is an elongated guide hole that allows the connecting portion to be inserted therethrough such that the connecting portion is rotatable and the connecting portion is able to be advanced toward and retracted from the rotational path of the cancel projection.

7. The input operating apparatus according to claim 6, wherein the operating lever is rotatable from a neutral position to at least a left-turn indication rotational position and a right-turn indication rotational position, wherein the first engaging portion projects toward the rotational path and is advanced toward and retracted from the rotational path, and wherein the second engaging portion projects in an opposite direction to a direction in which the first engaging portion projects and, during the retraction from the rotational path of the cancel projection, the second engaging portion is rotated so as to be brought into contact with the holding body, thereby rotating the holding body so as to cause the operating lever to be automatically returned from the left-turn indication rotational position or the right-turn indication rotational position to the neutral position.

* * * * *